(12) United States Patent
Galuppi et al.

(10) Patent No.: US 12,062,941 B2
(45) Date of Patent: Aug. 13, 2024

(54) SYSTEM AND METHOD FOR USING A UPS TO DYNAMICALLY CONTROL THE AMOUNT OF AC POWER RECEIVED FROM A UTILITY POWER SOURCE

(71) Applicant: Vertiv Corporation, Westerville, OH (US)

(72) Inventors: Graziano Galuppi, Imola (IT); Brian Scott Cogar, Lucas, OH (US); Stephen Michael Major, Westerville, OH (US); Livio Tilotta, Imola (IT); Stefano Pecorari, Modena (IT)

(73) Assignee: Vertiv Corporation, Westerville, OH (US)

( * ) Notice: Subject to any disclaimer, the term of this patent is extended or adjusted under 35 U.S.C. 154(b) by 0 days.

(21) Appl. No.: 17/685,326

(22) Filed: Mar. 2, 2022

(65) Prior Publication Data
US 2022/0285976 A1    Sep. 8, 2022

Related U.S. Application Data

(60) Provisional application No. 63/156,559, filed on Mar. 4, 2021.

(51) Int. Cl.
*H02J 9/06* (2006.01)
*H02J 9/00* (2006.01)

(52) U.S. Cl.
CPC .............. *H02J 9/062* (2013.01); *H02J 9/005* (2013.01)

(58) Field of Classification Search
CPC ................. H02J 9/062; H02J 9/005
See application file for complete search history.

(56) References Cited

U.S. PATENT DOCUMENTS

| | | | |
|---|---|---|---|
| 6,636,019 B2 | 10/2003 | Stevens | |
| 7,872,450 B1 | 1/2011 | Cohen et al. | |
| 8,193,662 B1 | 6/2012 | Carlson et al. | |
| 9,041,354 B2 * | 5/2015 | Lee .......................... | H02J 7/35 320/140 |

(Continued)

OTHER PUBLICATIONS

International Search Report and Written Opinion regarding International Patent Application No. PCT/US/2022/018828, dated May 31, 2022.

*Primary Examiner* — Daniel Cavallari
(74) *Attorney, Agent, or Firm* — HARNESS, DICKEY & PIERCE, P.L.C.

(57) ABSTRACT

The present disclosure relates to an uninterruptible power supply (UPS) for monitoring and prioritizing use of available power. The UPS has an electronic controller with a memory and a software control module. The UPS also has a battery, a rectifier for rectifying available AC power from a primary external AC power source to produce DC power, an inverter in communication with the rectifier for generating AC power from the DC power provided by the rectifier, and a DC/DC converter in communication with the rectifier for producing a DC charging current for use in charging the battery. The electronic controller and the software control module are configured to dynamically prioritize the use of available power from at least one of the primary AC power source and from the battery, to maintain adequate power to a load being supported by the UPS, as well as to charge the battery of the UPS when predetermined operating conditions are met.

12 Claims, 3 Drawing Sheets

(56) References Cited

U.S. PATENT DOCUMENTS

| | | | |
|---|---|---|---|
| 2009/0033283 A1* | 2/2009 | Beg | H02J 9/062 |
| | | | 320/128 |
| 2011/0227415 A1 | 9/2011 | Hjort et al. | |
| 2014/0111137 A1* | 4/2014 | Tanikawa | H01M 10/44 |
| | | | 320/101 |
| 2015/0035359 A1 | 2/2015 | Chung et al. | |
| 2016/0285267 A1 | 9/2016 | Stone et al. | |
| 2021/0203165 A1* | 7/2021 | Erokhovets | H02J 9/061 |

* cited by examiner

SYSTEM AND METHOD FOR USING A UPS TO DYNAMICALLY CONTROL THE AMOUNT OF AC POWER RECEIVED FROM A UTILITY POWER SOURCE

CROSS-REFERENCE TO RELATED APPLICATIONS

This application claims the benefit of U.S. Provisional Application No. 63/156,559, filed on Mar. 4, 2021. The entire disclosure of the above application is incorporated herein by reference.

FIELD

The present disclosure relates to uninterruptible power sources, and more particularly to systems and methods for controlling power received by a UPS from at least one power source, and for dynamically prioritizing the use of available power from a utility power source or a secondary power source both to maintain adequate power to a load, as well as to charge a battery of the UPS, in a highly efficient manner.

BACKGROUND

The statements in this section merely provide background information related to the present disclosure and may not constitute prior art.

Uninterruptible power supplies (UPSs) are widely used in data centers as well as other critical locations or environments (e.g., hospitals, financial institutions, military installations, etc.) to provide backup power to HVAC subsystems, servers and a wide variety of other subsystems that require an AC power source for operation. Traditional UPSs, however, have not included any means to adjust the power being received from one or more available utility power sources, short of simply uncoupling the UPS from the utility power source or powering down the UPS. It would be a significant benefit to be able to adjust the amount of power being received by a UPS from a given utility power source, and even more so to provide the control capability of prioritizing the use of available current from the primary power source to maintain a load powered while reducing the amount of current supplied to the UPS's batteries during recharging. Moreover, it would be highly desirable to be able to dynamically adjust the AC power received from a utility power source to meet the changing needs in a data center.

SUMMARY

This section provides a general summary of the disclosure, and is not a comprehensive disclosure of its full scope or all of its features.

In one aspect the present disclosure relates to an uninterruptible power supply (UPS) for monitoring and prioritizing the use of available power. The UPS may comprise an electronic controller having a memory and a software control module, a battery, a rectifier for rectifying available AC power from a primary AC power source to produce DC power, an inverter and a DC/DC converter. The inverter is in communication with the rectifier for generating AC power from the DC power provided by the rectifier. The DC/DC converter is in communication with the rectifier for producing a DC charging current for use in charging the battery. The electronic controller and the software control module are configured to dynamically prioritize the use of available power from at least one of the primary AC power source or the battery. In this manner the UPS is able to maintain adequate power to a load being supported by the UPS, as well as to charge the battery of the UPS when predetermined operating conditions are met.

In another aspect the present disclosure relates to a method of using an uninterruptible power supply (UPS) for monitoring and prioritizing the use of available power. The method may comprise providing a UPS having a memory, a software control module, a battery, and setpoints for maximum input current to be drawn by the UPS, maximum power input to be drawn by the UPS, and maximum battery charging current to be drawn by the UPS for charging the battery. The method further includes using the electronic controller and the software control module to monitor power being provided by the primary AC power source. The method further includes determining if the power being provided by the primary AC power source is sufficient to both charge the battery and meet the load requirement without exceeding the maximum input current and the maximum power input. The method further includes reducing a charging current being supplied by the UPS to the battery by a predetermined amount to reduce the charging current from a first level to a second level less than the first level. The method further includes making a determination if the load requirement can be met by the UPS while the charging current is maintained at the second level. When the load requirement can be met while the charging current is maintained at the second level, then the UPS continues supporting the load requirement while simultaneously continuing charging of the battery at the second level of the charging current.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
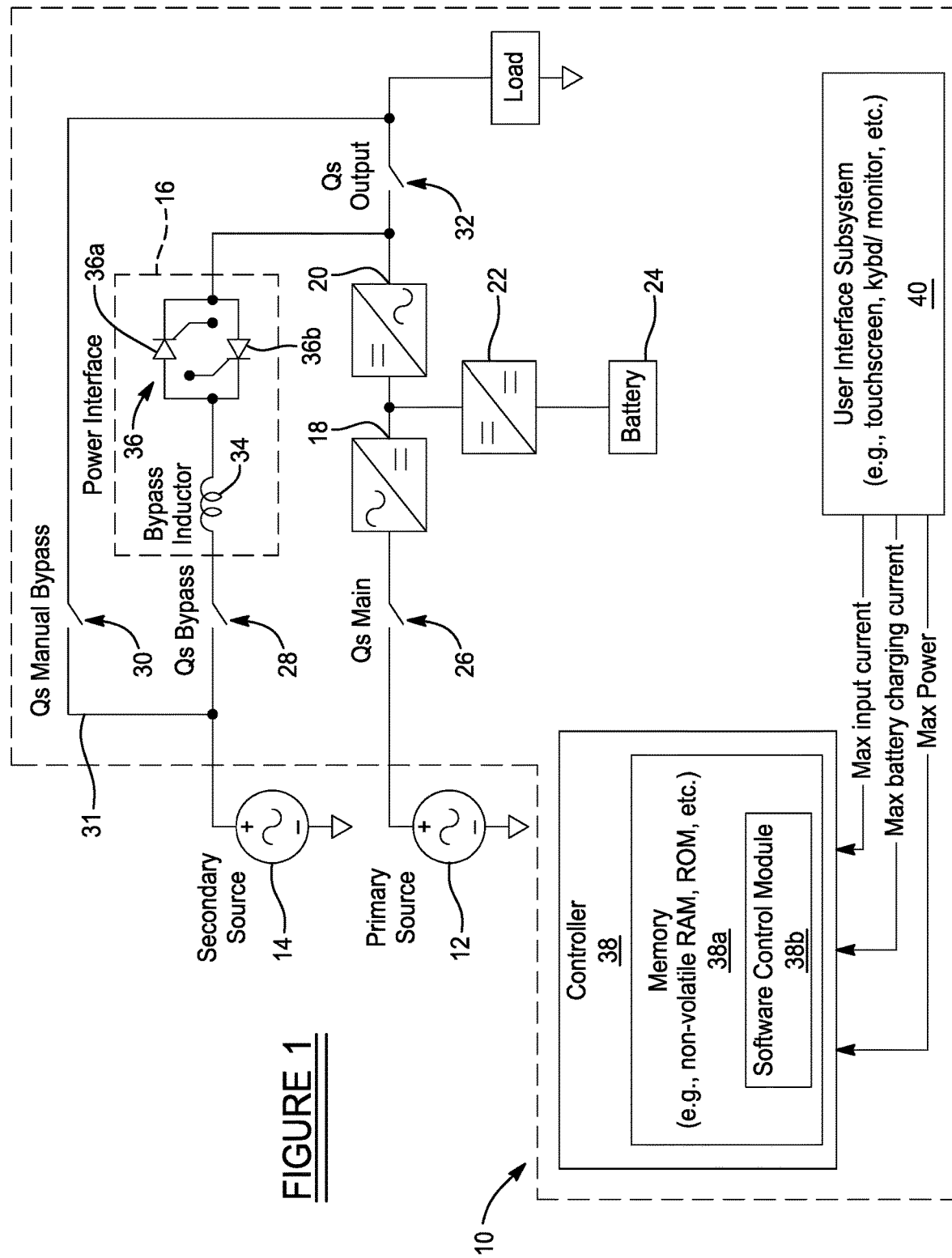
FIG. 1 is a high level block diagram of one UPS in accordance with one embodiment of the present disclosure, where the UPS may be driven by a primary AC power source and a secondary AC power source.

Referring to FIG. 1, there is shown an uninterruptible power supply (UPS) 10 in accordance with one embodiment of the present disclosure. In this example the UPS 10 is shown being configured to absorb power from either a primary AC power source 12 or a secondary AC power source 14. Typically the primary AC power source 12 is an AC power grid, while the secondary AC power source 14 may be, in one example, a generator or other energy source capable of being configured to provide an AC power output.

The UPS 10 includes the typical components of a power interface circuit 16, a rectifier 18, an inverter 20, a DC-to-DC converter 22 and a battery bank 24. A main switch 26 allows power from the primary AC power source 12 to be interrupted to the rectifier 18, while a bypass switch 28 allows power to be interrupted to the power interface circuit 16. A manual bypass switch 30 positioned in series in a bypass line 31 allows power from the secondary AC power source 14 to be interrupted when the UPS 10 is running in bypass mode being powered from the secondary AC power source 14. An output switch 32 allows the output of the inverter 20 to be uncoupled from a Load.

The power interface circuit 16 includes the usual components of a bypass inductor 34 in series with an SCR switch 36 made up of back-to-back coupled SCRs 36a and 36b. The Load may be a critical load, meaning that it is a load that needs a safe shut down when a power failure occurs, or a non-critical load that does not require any specific shut down procedure. For convenience, the term "Load" will be used in the following discussion with the understanding that this term may encompass either critical or non-critical loads.

The UPS 10 also includes an electronic controller 38 having a memory 38a. The memory 38a may be a non-volatile memory such as RAM, ROM, etc. which stores a software control module 38b. The controller 38 receives a plurality of inputs that may be set from a user interface subsystem 40. The inputs may include, without limitation, a maximum ("Max") input current, a maximum ("Max") battery charging current and a maximum ("Max") power input. The Max input current is the maximum steady state current that the rectifier 18 can absorb from the primary AC power source 12. The Max battery charging current is the maximum charging current that can be absorbed by the battery bank 24 for recharging purposes. A control setpoint for the Max power input is the maximum power that the primary power source 12 can supply. An alternative to the Max power input control setpoint is the maximum load power, which is the amount of power that can be supplied on a continuous basis by the primary power source 12 to the Load.

The user interface subsystem 40 may include a touchscreen interface or any one or more of a keypad, a monitor, a mouse, or any other user input device, for enabling a user to set the above-described inputs/levels. It will be appreciated that the present disclosure is not limited to any specific means or mechanism for enabling the input of variables that the UPS 10 uses in its operation.

The UPS 10 may operate in either VFI (Voltage Frequency Independent) or VI (Voltage Independent) modes, and in either instance feeds the Load to maintain the Load fully powered with AC power. The software control module 38b provides software to address several different conditions that may arise during operation of the UPS 10 in either the VFI or VI operating modes. For example, if a low input voltage to the rectifier 18 is present, or if a low output power value is present, action may be needed to reduce the current drawn for battery bank 24 recharging purposes so that the UPS 10 will still be able to provide sufficient power to power the Load. In addition to certain operating conditions arising that require the UPS 10 to modify how it uses the available current from the primary AC power source, the UPS 10 also needs to be able to adjust to meet additional requirements that may be imposed based on customer specifications (e.g., upstream transformers, local generators, etc.) that may also require modification of the energy consumption by the UPS 10 to ensure that the Load remains fully powered. These limitations collectively require suitable algorithms capable of looking at a number of variables and determining how best to use (or absorb) the current available power from the primary AC power source 12. The software control module 38b meets these needs, as will be described with regard to FIGS. 2a and 2b.

Figure 2A:
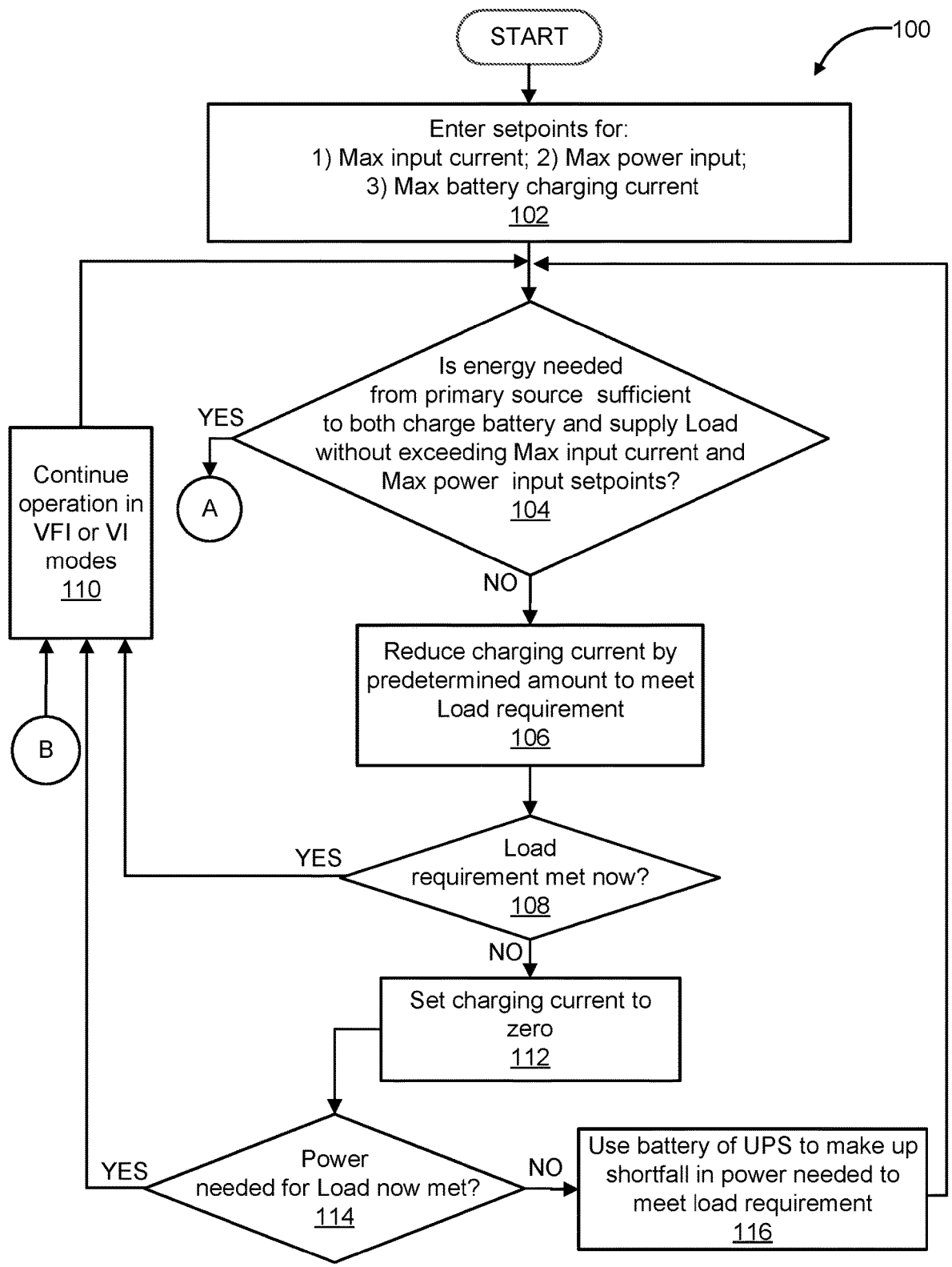
FIGS. 2*a* and 2*b* are flowcharts setting forth one example of a methodology of the present disclosure showing operations that may be performed by the software control module of FIG. 1 in prioritizing the use of available current from a primary power source.
Figure 2B:
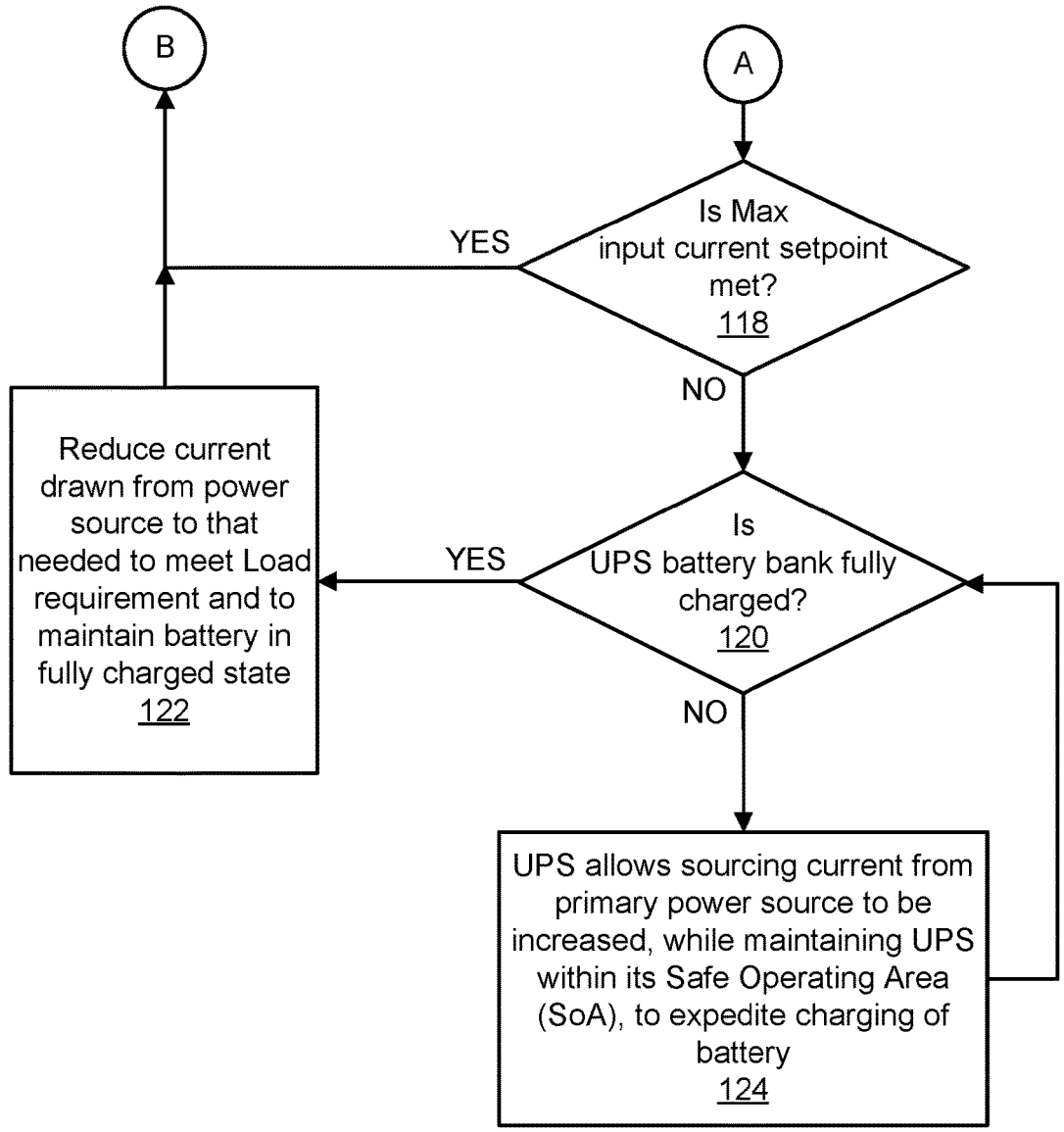

With initial reference to FIGS. 2a and 2b, a flowchart 100 is shown which represents one example of the algorithms/operations which may be carried out by the software control module 38b in monitoring and prioritizing the use of available power from at least two different power sources. It will be appreciated that minor modifications may be made to the operations described in FIGS. 2a and 2b, or to the order of operations, without departing from the scope of the present disclosure.

At operation 102 in FIG. 2a, the user may initially enter the variables (i.e., setpoints) for Max input current, Max battery charging current and Max power input. These values may be entered by the user via the user interface 40. Optionally, they may be programmed into the memory 38a associated with the controller 38 at the time of manufacture of the UPS 10. At operation 104, a check is then made if energy (i.e., power) needed from the primary AC power source 12 is sufficient to both charge the battery bank 24 and supply the Load without exceeding the Max input current value, the Max power input or the Load power setpoints. If this check produces a "NO" answer, then at operation 106 the charging current may be reduced by the controller 38 to meet the load requirement. At operation 108 the controller 38 makes another check to determine if the load requirement is now met. If this check produces a "YES" answer, then operation in the VFI or VI modes may continue, as indicated at operation 110, and operations 104-108 may then be repeated.

It will be appreciated that in the VFI and VI modes, the UPS 10 feeds the Load with the Max input current setpoint being met. However, due to low input voltage or to the value of the input or Load power, the charging current will be reduced, or even set to zero, as more fully explained below, to prioritize the Load. In the event that the charging current is set to zero, if the input current setpoint is reached and no additional power can be sourced from the primary power source 12 to supply the Load, then part of the Load is fed from the battery bank 24. It will also be appreciated that when operating in VFI mode, the UPS 10 will be working to reduce the power absorption from the rectifier 18. And when operating in VI mode, the UPS 10 operates to reduce the power absorption from the bypass line.

Continuing in FIG. 2a, if the check at operation 108 indicates that the Load requirement has not been met and produces a "NO" answer, meaning that reducing the charging current did not free up sufficient additional power for powering the Load, then at operation 112 the controller 38 sets the charging current to zero. At operation 114 the controller 38 then makes a check if the power needed for powering the Load has now been met. If this check produces a "YES" answer, then operation may continue in either the VFI or VI mode, as indicated at operation 110, and then operations 104-108 may be repeated.

If the check at operation 114 produces a "NO" answer, meaning that even after setting the charging current to zero, insufficient power is available to power the Load, then at operation 116 the controller 38 uses the battery bank 24 to make up the shortfall in power needed to meet the Load requirement. After operation 116, the controller 38 repeats operation 104.

With brief reference to FIG. 2b, if the check at operation 104 in FIG. 2a has produced a "YES" answer, meaning that the current available from the primary AC power source 12 is sufficient to supply the Load and charge the battery bank 24 without exceeding the Max input current set by the user, then at operation 118 in FIG. 2b a check is made by the controller 38 to determine if the Max input current setpoint is currently being met. If this check produces a "YES" answer, then operation in the VFI or VI modes may continue (operation 110 in FIG. 2a). But if the check at operation 118 produces a "NO" answer, meaning that additional current may be drawn by the UPS 10 without exceeding the Max input current setpoint, then at operation 120 the controller 38 makes a check to determine if the UPS's 10 battery bank 24 is fully charged. If this check produces a "YES" answer, then at operation 122 the controller 38 reduces the current being drawn from the primary AC power source 12 to that amount which is needed to meet the Load and normal battery charging needs, and operation 110 in FIG. 2a is repeated.

If the UPS 10 charge state check at operation 120 produces a "NO" answer, meaning that the battery bank 24 is not fully charged, then at operation 124 the UPS controller 38 allows sourcing current from the primary AC power source 12 to be increased while maintaining the UPS 10 within its Safe Operating Area (SoA), to expedite full charging of the battery bank 24. By Safe Operating Area (SoA), it is meant the maximum input characteristics (e.g., current and power) that allow the internal components of the UPS 10 to operate within their specifications (e.g., their thermal limits). Operations 120 and 124 may be repeated until the check at operation 120 indicates that the UPS 10 battery bank 24 is fully charged, at which point operations 122 and 110 are repeated.

The battery bank 24 may have a setpoint that defines a fully charged state, and this setpoint may be input via the user interface 40 and monitored by the controller 38. Alternatively, a separate (i.e., external) controller may be used to monitor the battery fully charged setpoint, in which case the separate controller may need to communicate with the controller 38 to ensure full control over charging of the battery bank 24. Still further, the UPS 10 may be configured through the software control module 38b to enable charging and/or discharging of the battery bank 24 in accordance with a programmable power ramp. Still further, the battery bank 24 power reference, or in other words its available power at any given time, may be determined using an external controller, in which case the external controller may need to communicate with the controller 38 to provide full functionality for the UPS 10.

The controller 38, using the software control module 38b, thus is able to examine the input current being sourced from the primary AC power source 12, and to prioritize use of the available input current to first meet the needs of the Load. This action may involve dynamically adjusting the amount of current being used for charging purposes and, if needed, completely interrupting the flow of charging current to the battery bank 24 to maintain a level of available power for powering the Load. Alternatively, if the Max input current is not being drawn by the UPS 10 to power the Load, the UPS can enter an "enhanced" charging mode where additional current beyond that which would normally be provided to the battery bank 24 will be sourced to the battery bank to more quickly fully charge the battery bank.

The above charging and dynamic control features implemented by the UPS 10, which allow modification of the battery charging operations in real time, as well as enabling real time decisions to be made by the controller 38 as to how best to use power from two or more available power sources to prioritize maintaining power to the Load, may also be retrofitted in some instances into a pre-existing UPS. This would be assuming that the pre-existing UPS has a suitable controller, memory and power/current monitoring subsystems, and a means for inputting the needed Max input current and Max power input and Max battery charging current values.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An uninterruptible power supply (UPS) for monitoring and prioritizing use of available power, the UPS comprising:
   an electronic controller having a memory and a software control module;
   a battery;
   a rectifier for rectifying available AC power from a primary AC power source to produce DC power;
   an inverter in communication with the rectifier for generating AC power from the DC power provided by the rectifier;
   a DC/DC converter in communication with the rectifier for producing a DC charging current for use in charging the battery;
   the electronic controller and the software control module configured:
      to dynamically prioritize the use of available power from at least one of the primary AC power source and from the battery;
      to maintain adequate power to a load being supported by the UPS, as well as to charge the battery of the UPS when predetermined operating conditions are met;
      to provide at least one of a maximum input current, a maximum power input or a maximum charging current that the UPS is able to receive;
      to determine when an increase of current from the primary AC power source can be requested while charging the battery, to accelerate charging of the battery, while still meeting a requirement of the load; and
   wherein the electronic controller and the software control module are further configured with each of:
      the maximum input current that the UPS is able to receive;
      the maximum power input that the UPS is able to receive; and
      the maximum charging current that the UPS is able to receive for charging the battery.

2. The UPS of claim 1, further comprising a user interface subsystem for enabling user settable inputs for each of the maximum input current, the maximum power input and the maximum charging current.

3. The UPS of claim 1, wherein the predetermined operating conditions include one or more of a maximum input current and a maximum power input of the UPS, and wherein the electronic controller, working in connection with the software control module, is further configured to determine when an amount of energy needed from the primary AC power source is sufficient to both charge the battery and supply the load without exceeding the maximum input current and maximum power input of the UPS.

4. The UPS of claim 3, wherein the electronic controller, working in connection with the software control module, is further configured to reduce a charging current being applied to the battery by an amount sufficient to enable a load requirement of the load to be met by the UPS, when it is determined that insufficient energy is being supplied by the primary AC power source to simultaneously charge the battery and meet a load requirement created by the load.

5. The UPS of claim 4, wherein the electronic controller, working in connection with the software control module, is further configured to check when a reduction in the charging current applied to the battery has enabled the load requirement to be met.

6. The UPS of claim 5, wherein the electronic controller, working in connection with the software control module, is further configured to set the charging current to zero when needed to enable the load requirement to be met using power received form the primary AC power source.

7. The UPS of claim 6, wherein the electronic controller, working in connection with the software control module, is further configured to check if sufficient power is being supplied to the load to meet the load requirement after setting the charging current to zero, and when the load requirement is still not being met, to use the battery to supply additional power to make up a shortfall in power being supplied from the primary AC power source, to thus enable the UPS to meet the load requirement.

8. The UPS of claim 3, wherein the electronic controller, working in connection with the software module, is further configured to check if the maximum input current of the UPS has been met when the primary AC power source is supplying sufficient power to simultaneously meet the load requirement and to charge the battery, without exceeding the maximum power input of the UPS.

9. The UPS of claim 8, wherein the electronic controller, working in connection with the software module, is further configured to check if the battery is fully charged while the primary AC power source is supplying sufficient power to simultaneously meet the load requirement and to charge the battery, while not exceeding the maximum power input of the UPS.

10. The UPS of claim 9, wherein the electronic controller, working in connection with the software module, is further configured to reduce a current being drawn from the primary AC power source to meet the load requirement and to maintain the battery in a fully charged state, when it is determined that the battery is fully charged.

11. The UPS of claim 9, wherein the electronic controller, working in connection with the software module, enables the current being drawn from the primary AC power source to be increased to expedite battery charging, when the maximum input current is not being met and the maximum power input is not being exceeded, and the current being drawn from the primary AC power source is also sufficient to maintain operation of the UPS within the predetermined Safe Operating Area (SoA) and to meet the load requirement.

12. An uninterruptible power supply (UPS) for monitoring and prioritizing use of available power, the UPS comprising:

an electronic controller having a memory and a software control module;

a battery;

a rectifier for rectifying available AC power from a primary AC power source to produce DC power;

an inverter in communication with the rectifier for generating AC power from the DC power provided by the rectifier;

a DC/DC converter in communication with the rectifier for producing a DC charging current for use in charging the battery;

the electronic controller and the software control module configured:

to dynamically prioritize the use of available power from at least one of the primary AC power source and from the battery;

to maintain adequate power to a load being supported by the UPS, as well as to charge the battery of the UPS when predetermined operating conditions are met;

to provide at least one of a maximum input current, a maximum power input or a maximum charging current that the UPS is able to receive; and wherein the electronic controller, working in connection with the software module, is further configured to enable the current being drawn from the primary AC power source to be increased to expedite battery charging, when the maximum input current is not being met and the maximum power input is not being exceeded, and the current being drawn from the primary AC power source is also sufficient to maintain operation of the UPS within a predetermined Safe Operating Area (SoA) and to meet the load requirement.

* * * * *